United States Patent [19]
Parkison

[11] 3,834,416
[45] Sept. 10, 1974

[54] CERAMIC DISC FAUCET VALVE

[75] Inventor: Richard G. Parkison, Somerville, N.J.

[73] Assignee: American Standard Inc., New York, N.Y.

[22] Filed: Feb. 26, 1973

[21] Appl. No.: 335,616

Related U.S. Application Data
[63] Continuation-in-part of Ser. No. 244,503, April 17, 1972.

[52] U.S. Cl.......... 137/550, 137/625.31, 137/454.2, 251/180, 251/304
[51] Int. Cl. ...... F16k 5/04, F16k 5/18, F16k 47/14
[58] Field of Search.................... 251/304, 313, 180; 137/625.31, 550, 625.17, 454.2, 454.5, 454.6, 625.46

[56] References Cited
UNITED STATES PATENTS

| | | | |
|---|---|---|---|
| 2,089,943 | 8/1937 | Busby | 137/625.46 X |
| 2,935,293 | 5/1960 | Monson | 137/625.31 X |
| 3,067,768 | 12/1962 | Borg | 137/625.31 X |
| 3,159,179 | 12/1964 | De Lain | 137/550 X |
| 3,273,850 | 9/1966 | Kolze | 251/304 X |
| 3,372,709 | 3/1968 | Dolter | 137/625.31 |
| 3,433,264 | 3/1969 | Parkison | 137/625.17 |
| 3,465,782 | 9/1969 | Parkison et al. | 137/625.31 X |
| 3,473,562 | 10/1969 | Ellison | 137/549 |
| 3,677,516 | 7/1972 | Hicks | 251/304 X |

*Primary Examiner*—William R. Cline
*Attorney, Agent, or Firm*—Jefferson Ehrlich; Robert G. Crooks

[57] ABSTRACT

This application discloses a valve structure for controlling the flow of a fluid, such as water, to be delivered from a faucet. The valve structure includes a housing having a tapered inner wall shaped to have a central cylindrical opening for receiving and guiding a rotatable longitudinal stem. Two ceramic discs mounted about the stem and in intimate contact with each other are arranged so that the upper disc is held stationary against motion about and along the stem, while the lower disc is coupled to the stem to rotate with the stem without introducing any rotation of the upper disc. The coupling of the lower disc to the stem is achieved by a spider member having an opening to receive and grip a tang at the base of the stem. The spider member also has extended arms which reach to about the periphery of the lower disc and cause the lower disc to follow any rotary movement of the stem. The spider member also applies spring pressure against the under surface of the lower disc to hold it in contact with the upper disc. Each of the ceramic discs has a plurality of ports through which the fluid flows when the ports of the lower disc are in alignment with those of the upper disc but, when the stem is rotated to dis-align the ports of the two discs and eliminate any overlap between the ports of the two discs, the fluid flow will be stopped. The contiguous surfaces of the two discs are very smooth and flat to prevent leakage of fluid between the discs and additionally to minimize friction and drag. A handle may be affixed to the top of the stem to control the rotary motion of the stem. Screens may be positioned above the upper disc and they may be held within the tapered wall of the housing and, being in the fluid flow path, they serve to minimize noise that would otherwise be generated by the rapid fluid flow through the valve structure.

11 Claims, 8 Drawing Figures

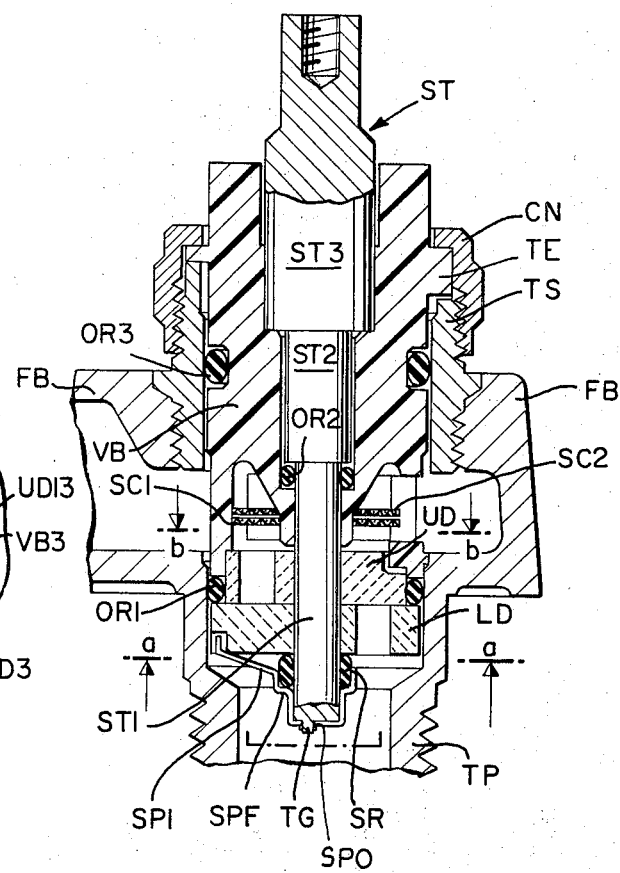
FIG. 3
FIG. 5
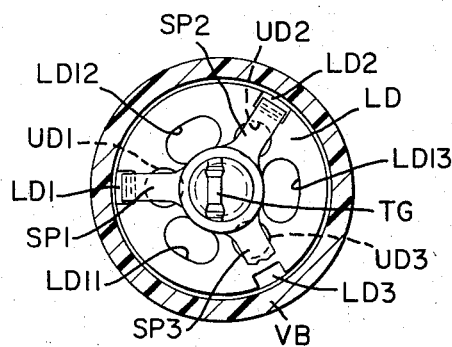
FIG. 4

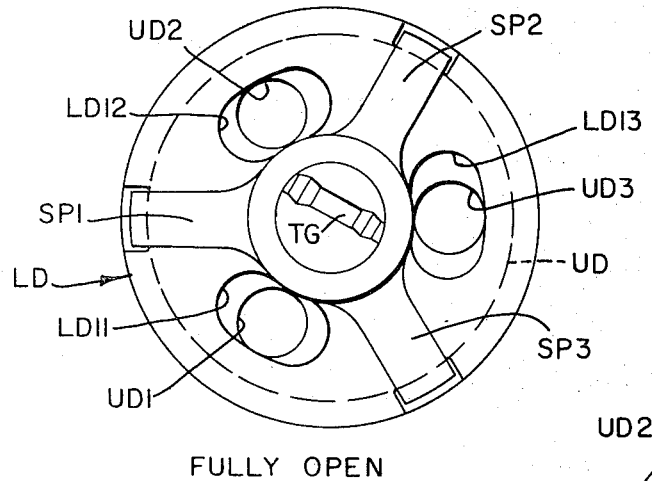
FIG.6 FULLY OPEN
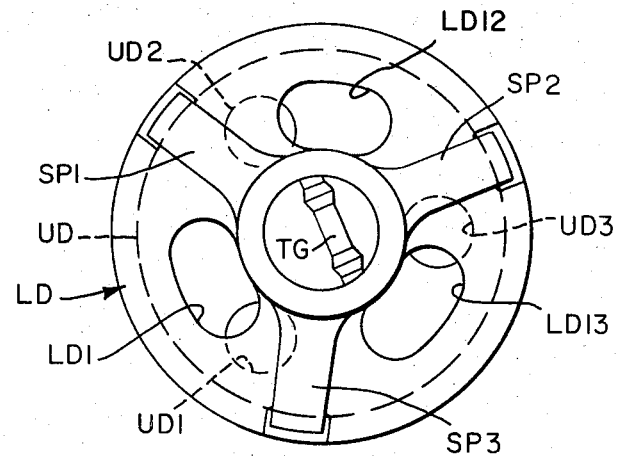
FIG.7 ¼ OPEN
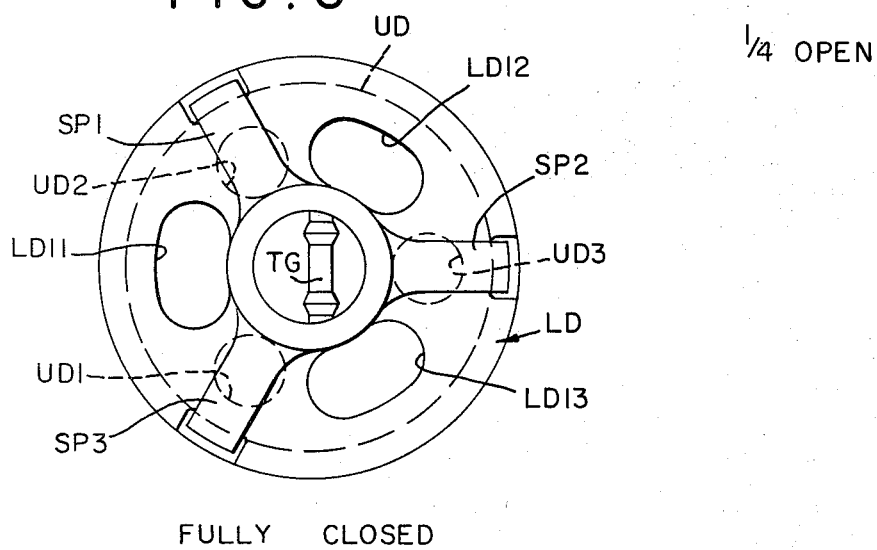
FIG.8 FULLY CLOSED

CERAMIC DISC FAUCET VALVE

The present application is a continuation-in-part of applicant's copending application Serial No. 244,503 filed Apr. 17, 1972, entitled "Ceramic Disc Faucet" and assigned to the same assignee.

This invention relates to control valves for use in faucets for kitchen sinks or lavatories and the like, for providing either hot water or cold water to such faucets so that, when two such valves are employed, the separately supplied hot and cold water may be mixed in the conventional way by the user and the mixed water discharged from the faucet.

The present invention is directed to an improved control valve which embodies a relatively small cartridge which embodies novel features and is otherwise superior in its performance characteristics not only as to ease of operation and ease of maintenance, but as to a longer life span, especially when compared to a conventional type of valve for a sink or lavatory which employs a vertically movable rubber-like washer element positioned above and movable toward and away from a stationary valve seat, and which has been used for decades in conventional faucets for plumbing fixtures for controlling the flow of water into the sink or lavatory.

In accordance with the present invention, the control valve includes a pair of hard, smooth, flat, long-lasting, contacting ceramic members or discs, one of which is always stationary and entirely free of any motion, while the other ceramic member is rotatable over a limited angle about its center or axis, but is never movable along the axis, so that both discs are continuously in contact. One of the features of the present pair of ceramic members is that they are both provided with an equal number of through apertures, preferably a plurality of apertures, such as three (or four or more) in number, all axially aligned with each other. When the apertures of the two discs are fully out of alignment, the flow of water through the tandem arranged apertures will be completely interrupted. On the other hand, when the apertures within the two discs are fully aligned, the flow of water through the tandem-arranged apertures will be at the maximum rate. The flow can be adjusted to any intermediate rate merely by manual, rotary adjustment of the rotatable disc.

In accordance with this invention, both ceramic disc members will have a common central aperture through which will be inserted a rotary stem which is manually rotatable to adjust the flow rate through the valve. The function and organization of the rotary stem, as will be explained, will be to initiate the rotation of the lower disc without changing the position of the upper one, and the lower disc may be rotated through an angle always corresponding to the angular rotation of the rotary stem. The two discs are in axial alignment at all times while the stem is angularly displaced by any desired amount within predetermined limits.

In further reference to the present invention, the lower end of the rotary stem will be provided with a tang or other protuberance, and the tang or protuberance will be mechanically coupled to and held by a spider member having arms or tentacles which are firmly gripped to the peripheral regions of the lower, rotatable ceramic member. The tang will fit into an aperture of the spider member which is shaped to correspond to the cross-sectional configuration of the tang so that the tang is upset or staked so that the spider member is locked to the lower portion of the stem. Hence, any rotary movement of the stem will not only cause the tang to rotate through a corresponding angular displacement thereby carrying the spider member through a similar angular displacement, but the lower ceramic disc will also be translated axially through a similar angular displacement to correspondingly change the relative positions of the apertures of the lower or rotary ceramic member with respect to the apertures in the upper or fixed ceramic member. Thus, by mere rotation of the stem, the spider and the lower ceramic disc will be translated through a rotary angle corresponding to the rotation of the stem, thereby changing the flow rate through the tandem apertures of the two disc members as may be desired without separating the disc members from each other.

A feature of this invention resides in the employment of a spider member at the base of the stem bearing the two ceramic disc members, the spider member being made of a springy material, such as stainless steel or phosphor bronze, so that the spider member will exert a continuous upward pressure against the lower disc to maintain it in continual contact with the contiguous upper disc and thereby prevent water leakage between the discs. The surfaces of the discs, which are in continual contact, are hard and very flat and maintain a leakproof seal by continual adherence between the flat contacting adjacent surfaces. The smoothness of the surfaces of such discs minimizes friction or drag between the discs.

Another of the features of this invention is that there are no rubber or other elastomer parts at the apertured or water ports of either disc. Hence, by confining all the flow control paths to ceramic surfaces, there will be no expansion or contraction of any such elastomer members due to temperature or other parameters. As is well known, such elastomer members readily undergo expansion with rise in the temperature of the water or otherwise, and undergo a corresponding contraction when the temperature recedes. Any and all such changes in temperature necessarily involve a significant, unexpected and undesired change in the water flow rate. Such changes can be troublesome in many instances. This type of faulty operation is completely obviated by this invention.

Furthermore, the rotary stem is of the so-called non-rising type and serves to avoid any vertical displacement of either of the ceramic discs, the unchanged vertical positions of which are so critically important in the practice of this invention. There is, therefore, no stem-threaded backlash which is generally encountered in conventional faucet valves and which introduces difficulties in maintaining constant the preselected quantities of water traversing the faucet.

In accordance with the present invention, each of the two ceramic discs is provided with a plurality of ports, such as three ports, for example. Thus, the flow of fluid through the valve is divided into three ports in the example. By employing a plurality of ports, quieter operation will be achieved without increasing the selected total or overall fluid flow rate.

In accordance with an option of this invention, two (or more) screens may be positioned and held coaxially about the stem and may be located between the upper ceramic disc and the spout through which the incoming water is to be discharged. If employed, these screens serve to significantly diminish the noise factor inherent in most conventional valve mechanisms. Furthermore, such screens will be positioned and maintained in a self-cleaning condition, but in the event that they do become clogged, an alternate path for the water flow is provided so as not to create a water blockade.

And still furthermore, the valve structure components of this invention, including the valve stem, the ceramic discs and the spider member, will be housed in a body member to form a substantially self-contained cartridge. The cartridge will be assembled at the factory and may be sold and transported as a unit. The cartridge can be quickly and easily installed upon the sink or lavatory or other fixture and may be just as quickly and easily removed for repair or replacement.

This invention, together with its further objects and features, will be better and more clearly understood from the more detailed description and explanation hereinafter following when read in connection with the accompanying drawing in which:

FIG. 3 illustrates a front elevational view, in crosssection, of the general arrangement of the structure of this invention;

FIG. 4 shows a plan view, taken along lines a—a of FIG. 3, of the underside of the lower or rotary ceramic disc element of this invention;

FIG. 5 shows a plan veiw, taken along lines b—b of FIG. 3, of the upper side of the upper or stationary disc element of this invention;

FIG. 6 shows an underside view of the two ceramic discs when they are in their fully open position;

FIG. 7 shows a similar underside view of the relative positions of the two ceramic discs when they are in their partially open position; and FIG. 8 shows a corresponding view of the same two discs in their fully closed position.

The same or similar reference characters will be employed to indicate and represent the same or similar parts wherever they may occur throughout the drawing.

Figure 1:
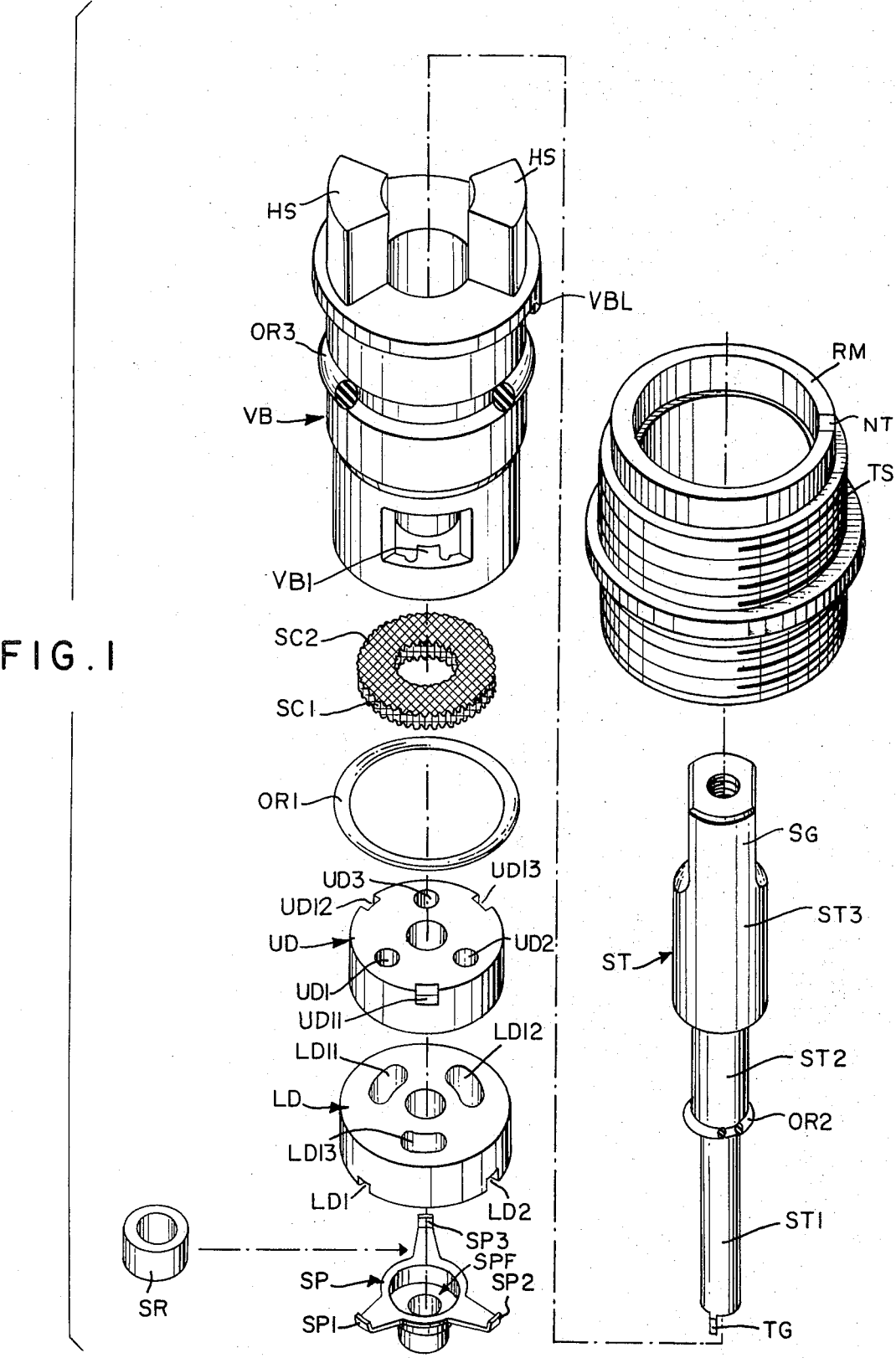
FIG. 1 illustrates an exploded view of the structure of the components to be included within a cartridge, along with the threaded sleeve that surrounds the cartridge.
Figure 2:
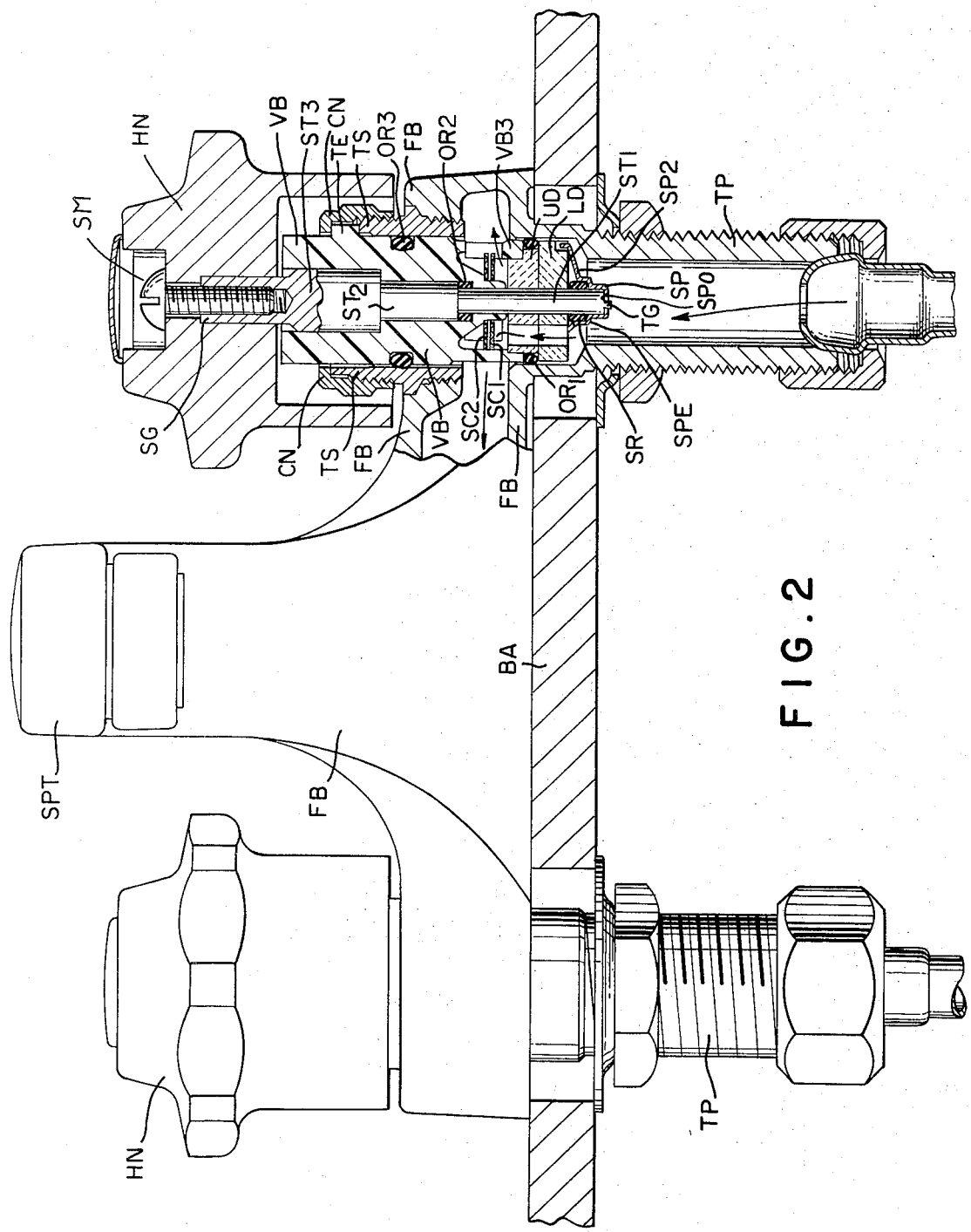
FIG. 2 illustrates a view of the structure of the invention as applied to a faucet fitted with hot and cold water valves, this figure showing, in cross-section along the axis of the valve structure, the principal components of the control valve of this invention.

Referring to FIGS. 1, 2 and 4 of the drawing, the stem ST is shown illustratively as an elongated vertical member having four principal segments, a segment ST1 which is the section about which the upper disc UD and the lower disc LD are positioned, segments ST2 and ST3 about which the valve body VB is positioned, and a tang TG at the base of stem ST which is formed as a protrusion at the lower end of the segment ST1 of the stem ST. The upper surface of the lower disc LD and lower surface of the upper disc UD are both highly polished and very flat and they are held continually in intimate contact with each other throughout every operation of the valve mechanism. The closeness of the surface contacts between both discs UD and LD is so intimate as to resist and actually prevent the passage or seepage of water therebetween. The underside of the lower disc LD has three peripheral indentations LD1, LD2 and LD3 which receive and are gripped by the three upwardly projecting arms or tentacles SP1, SP2 and SP3 of the spider member SP. The spider member SP also has a somewhat elongated central opening SPO for receiving and gripping the tang TG of the stem ST so that the tang TG is upset or staked to lock the spider member SP to the stem ST, whereupon the spider member SP and the stem ST move together as a unitary structure.

A cylindrical rubber or elastomer seal ring SR is positioned between a counterbore face SPF in the spider member SP and the lower surface of the disc LD (see FIGS. 1, 2 and 3). This seal ring SR serves to prevent water leakage through the central openings of discs LD and UD, so that no water may flow upwardly from the threaded water pipe TP through the spaces between discs LD and UD and stem ST.

An externally threaded sleeve TS is joined to the internal threaded segment of the faucet body FB, as shown in FIGS. 2 and 3. The valve body is firmly seated on the upper rim of the sleeve TS, thereby limiting the downward movement of the valve body VB. A leg VBL on the valve body VB (see FIG. 1) nests into a notch NT in the threaded sleeve TS to rotationally secure and orient the cartridge in the body VB. A cap nut CN, which is internally threaded, engages the upper external threaded segment of the sleeve TS. When the cap nut CN is threadedly tightened to sleeve TS, it will hold the body VB in a steady, immovable position within the faucet body FB. The body VB may be regarded as a cartridge which houses several components including the discs LD and UD.

An O-ring OR1 is positioned in the space around the outer periphery of the upper disc UD and hence is positioned between the upper peripheral surface of the lower disc LD, the lower peripheral (horizontal) segment of the valve body VB, and the inner (vertical) wall of the faucet body FB, as shown in FIGS. 2 and 3. The O-ring OR1 serves to prevent leakage of water into the faucet body FB via the very small annular space between the outer rim of the valve body VB and adjacent inner wall of the faucet body FB.

Another O-ring OR2 is positioned about the outer cylindrical wall of the segment ST1 of the stem ST. The O-ring OR2 is positioned near the upper end of segment ST1 to prevent leakage of water upwardly via the very small space between the outer cylindrical wall of the adjacent stem segment ST2 of the stem ST and the adjacent inner cylindrical wall of the valve body VB.

Still another O-ring OR3, the largest of the several O-rings, is positioned in a peripheral outer cavity on the outer wall of the valve body VB, as shown in FIGS. 1, 2 and 3. This O-ring serves to prevent leakage of water through the very small peripheral space between the outer rim of the valve body VB and the adjacent inner wall of the sleeve TS.

Handle stops HS on the valve body VB are generally illustrated in FIG. 1. These stops HS cooperate with mating projections or webs (not shown) in the handle HN to appropriately limit the rotational motion of the handle HN.

If desired, two similar screens SC1 and SC2 may be positioned, as shown in FIGS. 1, 2 and 3, above the upper disc UD and may be held within the necked portion VB2 of the valve body VB. The screens SC1 and SC2 are located in the upward flow path to the spout SPT so as to provide a baffle for water that is discharged through the apertures of the upper disc UD and released to the spout SPT of the faucet body FB. These screens SC1 and SC2, preferably made of stainless steel, act to diminish noise that would otherwise be developed by the rapid flow of water through the valve mechanism.

A suitable handle HN is affixed to the upper segment SG of the stem ST by means of a threaded screw member SM, as shown in FIG. 2. The handle HN may be rotated in one direction to open the valve when pressurized incoming water is to flow upwardly from the pipe TP and through the apertures of the tandem-arranged discs LD and UD and against and through the screens SC1 and SC2 to the spout SPT via the opening in the faucet body FB as indicated generally by the arrows in FIG. 2. When the handle HN is rotated in the opposite direction, the flow will be reduced and, if the handle is rotated further to its maximum extent in the same direction, the flow of water will be completely cut off.

As shown in FIGS. 1 and 5, the upper disc UD embodies three substantially equal circularly cylindrical openings or ports UD1, UD2 and UD3 having their axes 120° apart with respect to the center of the disc UD. The upper disc UD has three peripheral notches UD11, UD12 and UD13 in the upper surface of disc UD, and these notches receive corresponding projections or dogs VB1, VB2 and VB3 extending inwardly from the inner wall of the valve body VB. These projections or dogs serve to prevent the upper disc UD from rotating in either direction about the stem segment ST1. Thus, the upper disc UD is held firmly fixed not only against rotary motion about stem ST, but also against vertical or translatory motion along the axis of the stem ST.

The lower rotary disc LD is shown in our illustration as embodying three openings or ports LD11, LD12 and LD13, all of which are substantially elliptically cylindrical in shape as shown in FIG. 4. The centerlines paralleling the axes of the openings LD11, LD12 and LD13 are approximately 120° apart with respect to the central axis of the disc LD. These centerlines are aligned with the axes of the three cylindrical openings UD1, UD2 and UD3 of the upper disc UD, as seen in FIG. 6, when the valve is fully open. The relations between the ports of both discs LD and UD will be explained later.

As already explained, the lower segment ST1 of stem ST has its tang TG held within the opening SPO of the spider member SP, and the spider arms or tentacles SP1, SP2 and SP3 of the spider member SP are held within the peripheral notches LD1, LD2 and LD3 of the lower disc LD and this disc must rotate through an angle corresponding to the rotation of the spider member SP. Hence, when the handle HN of the valve is rotated in one direction, the spider member SP will be rotated in the same direction through a corresponding angle about the centerline of the stem ST and carry with it the lower disc LD through a corresponding angular displacement. During the entire rotary movement of the lower disc LD, the upper disc UD will remain immovable in its fixed or stationary position. The contacting surfaces between the two discs are so finely ground that there is only a small frictional force exerted tending to resist the rotational motion as the faucet handle HN is operated by the user. It may be theorized that such materials, when flat and finely ground, are held attracted to each other by molecular adhesion, but this adhesion does not resist or otherwise preclude the rotation of the lower disc about the upper disc. Similarly, when the valve handle HN is rotated in the opposite direction, the rotation of the spider member SP, which is directly coupled mechanically to the stem ST via the tang TG and the arms SP1, SP2 and SP3 at the base of the spider member SP, will cause the lower disc LD to rotate in the opposite direction without, in any way, changing or otherwise affecting the stationary position of the upper disc UD.

The two discs LD and UD are shown in FIG. 8 in their fully closed positions for stopping the flow of water from the intake pipe TP to the spout SPT of the faucet body FB. However, as the handle HN is rotated in a direction to open the valve, the three elliptical openings LD11, LD12 and LD13 of the lower disc LD will more and more overlap the openings UD1, UD2 and UD3 of the upper disc UD, thereby gradually increasing the flow of water through the tandem-arranged openings or ports of the two discs.

FIG. 7 illustrates the relative positions of the ports of the two discs LD and UD when the valve is, say, one-quarter open. FIG. 6 shows the port positions when the valve is fully opened. The water flow through the valve will reach its maximum rate when the handle HN has been rotated to the fullest extent to the open position. The elliptically cylindrical shapes of the openings LD11, LD12 and LD13 of the lower disc LD serve to assure a positive and complete opening of the valve when water is to be turned on to its maximum extent, as shown in FIG. 6, notwithstanding a predetermined latitude given the user to make the valve opening full and complete. Likewise, as shown in FIG. 8, the elliptical shapes of the ports of the lower disc LD allow for the full closure of the valve to shut off the water flow notwithstanding an appropriate latitude given the user by this construction to effect the closure. The overlap of the ports for the valve opening in full is plainly visible in FIG. 6 while the spacing of the ports for the valve closing is visible from FIG. 8. Intermediate positions of the ports are readily selected by the user. This overlap feature of the construction of the tandem discs UD and LD of this invention is unique.

As shown in FIG. 2, there will be two substantially identical valves associated with the faucet body FB, one valve controlling the flow of cold water to the spout SPT and the other controlling the flow of hot water to the same spout SPT. Each of the two valves embodies the same cartridge arrangement of components shown, for example, in FIG. 3, and in the cross-section shown in FIG. 2. The details of assembly and connection of the faucet to the base BA of the fitting need not be described here because they are of conventional form and are well known and understood.

Each of the discs is illustratively shown as embodying three ports which are angularly displaced from each other by equal angles, such as 120°. One or two ports may be substituted for the three-port arrangement, but a three-port arrangement is preferred. It will be understood, however, that the number of ports may be less than, or more than, the preferred group of three in the practice of this invention. It has been determined, moreover, that an arrangement embodying three ports for each disc will materially reduce the noise property during high flow rates and hence render the operation relatively quiet.

While this invention has been shown as embodying a stationary upper disc and a rotatable lower disc, it will be readily apparent that, if desired, the upper disc may be made rotatable while the lower disc is held stationary at all times. The discs may be molded of a ceramic material having more than 90 percent alumina.

The embodiment of two screens, such as SC1 and SC2 within the valve body VB, is merely optional and may be entirely eliminated.

The stem ST has been described as made of metal, such as stainless steel. It will be apparent that the stem may be made of any other metal or of any plastic material. Similarly, the valve body VB, although described as made of non-metallic moldable material, may be formed of any metallic material, such as stainless steel, for example.

It will be apparent that this invention may be embodied in widely varied organziations without departing from the spirit of this invention.

What is claimed is:

1. A faucet valve for the plumbing fitting of a lavatory, or the like for controlling the rate of flow of water from a first conduit to a second conduit, said faucet valve comprising first and second ceramic discs in intimate contact with each other about their common interface, both discs having a central aperture and a plurality of additional apertures having their axes parallel to the first conduit and extending through the respective discs and, when aligned with each other, water may flow tandemly through said additional apertures from the first conduit to the second conduit and, when dis-aligned, the flow of water may be stopped, a longitudinal rotatable stem positioned within the central apertures of the first and second discs, means for continuously maintaining the first disc stationary so that it cannot be rotated, the second disc being rotatable about an axis perpendicular to the interface without changing the spacing between the two discs and having peripherally disposed indentations positioned on its face remote from said first disc, a spider member coupled to the base end of the stem and having a plurality of upwardly projecting arms received within said indentations and gripping the peripheries of the second disc thereby so that, when the stem is rotated, the spider member and the second disc will be jointly and equally rotated to change the positions of the aperture in the second disc with respect to the corresponding apertures in the first disc, and a handle mechanically coupled to the other end of the stem for controlling the rotation of the stem about its longitudinal axis.

2. A faucet valve according to claim 1, including a plurality of screens interposed between the first disc and the second conduit for reducing noise that would otherwise be produced by the flow of water through the faucet valve.

3. A valve for the control of the flow of water through a plumbing fitting for a fixture, such as a lavatory, comprising first and second adjacent solid discs having flat, smooth contiguous surfaces so as to be in continuous slidable contact with each other, each disc having a central aperture and a plurality of ports through which water may flow, said ports having their axes parallel to the first conduit, a longitudinal stem traversing the central apertures of both discs, a valve body in which the discs are housed and having a protruding element adjacent to the first disc, the first disc having a peripheral aperture to engage the protruding element of the valve body to prevent the rotation of the first disc, the second disc having peripherally disposed indentations positioned on its face remote from said first disc, a spider having a plurality of resilient arms mounted and held against and adjacent the lower end of the stem, said arms projecting upwardly and received within said indentations of said second disc to mechanically press the second disc against the first disc so that the second disc continuously responds to the rotation of the stem to control the flow of water tandemly through the ports of both discs without producing any rotation of the first disc, a handle mounted on the valve body and mechanically coupled to the other end of the stem to control the simultaneous and equal rotation of the stem and the second disc, whereby the rotation of the stem will control the volume of water flowing through the ports of both discs.

4. A valve according to claim 3, including screen means positioned and retained within the valve body and disposed about the longitudinal stem downstream of the first disc to reduce noise that would otherwise be developed by the flow of fluid through the valve.

5. A valve for the plumbing fitting of a plumbing fixture, comprising a housing, a handle, a vertical rotatable stem retained by the handle and inserted into the housing, first and second ceramic discs each having a central opening within which the stem is inserted, means including a projection on the housing holding the first ceramic disc against rotation about the stem and against any translation along the stem, said second disc having peripherally disposed indentatios defined in its face remote from said first disc, a tentacled member hald by the base of the stem; and bound by its tentacles projecting upwardly and received within said peripheral indentations of said second disc causing the second disc to be pressed against the first disc and to rotate the second disc in accordance with the rotation of the stem, both discs having a plurality of ports traversing said discs, the ports of the first disc being aligned with the ports of the second disc to allow water to flow therethrough in tandem or being dis-aligned to reduce or stop the flow of water through said ports.

6. A valve according to claim 5 including a plurality of screens positioned within and retained by the valve body and disposed about said vertical stem above the first disc, said screens being positioned to absorb the turbulent energy of the water streams traversing the valve ports and substantially reducing noise that would otherwise be generated by the flow of water through the ports of both discs.

7. A valve for controlling the flow of water in a plumbing fitting, comprising a housing having an inner wall in which is defined a cylindrical bore, a longitudinal stem positioned so as to be rotatable within the cylindrical bore of the housing, a handle mounted upon the upper end of the stem for rotating the stem about its longitudinal axis, first and second ceramic discs mounted about the stem so that the two discs adhere to each other and remain in intimate contact with each other, the first disc being held stationary by the housing to prevent its longitudinal movement along said stem or its rotary movement about said stem, the second disc having peripherally disposed means defined in its face remote from said first disc, a pair of screens positioned and retained within the inner wall of the valve housing and disposed about the stem each of the discs having a plurality of ports through which the water may flow when the ports of the two discs are aligned with each other and shut off the water flow when the ports of the two discs are fully out of alignment with each other, a spring mounted on the lower end of the stem and pressing continuously against the second disc to hold it in intimate contact with the first disc, said spring including means cooperating with said peripherally disposed means of said second disc for imparting rotary movement of the valve stem to the second disc, the spring being held by the stem so that it will be rotated conjointly with the stem, water passing through the ports of both discs thereafter traversing said screens as the water is exited from the valve, thereby to minimize noise generated by the flow of water.

8. A valve for the control of the flow of water in a plumbing fitting, comprising a first circular ceramic disc having a central opening and a plurality of similar ports, a second circular ceramic disc having a central opening and a like plurality of ports, a plurality of screens having central openings, the ports of the first ceramic disc being circularly cylindrical, the ports of the second ceramic disc being elliptically cylindrical and having the major axis of its ports longer than the diameter of the ports of the first disc, a longitudinal rotary stem traversing the central openings of the screens and the central openings of the first and second discs, a handle affixed to the top of the stem to control the rotation of the stem, a housing within which the stem, the screens and the discs are retained, a spring member affixed to the base of the stem directly and continuously applying mechanical pressure against the second disc to maintain its upper face continuously in contact with the lower face of the first disc, said spring member and second disc having interengaging means for imparting rotary movement of the valve stem to the second disc, and means in said housing for preventing the rotary or longitudinal movement of the first disc, water traversing the ports of both discs and the screens when the ports of the second disc are aligned with the ports of the first disc and the flow being stopped when the ports of the second disc are out of alignment with the ports of the first disc.

9. A valve according to claim 8 in which the disc is formed of ceramic material, 90 percent of which is alumina.

10. A valve according to claim 9 in which the elliptically cylindrical ports of the second disc have their minor axes substantially equal to the diameters of the circularly cylindrical ports of the first disc.

11. A valve according to claim 10 including a conduit for supplying pressurized water to the underside of the second disc and a conduit for receiving the water traversing the ports of both discs and the screens.

* * * * *